US008968876B2

(12) United States Patent
Temple

(10) Patent No.: US 8,968,876 B2
(45) Date of Patent: Mar. 3, 2015

(54) ANTI-GRAFFITI COATINGS

(75) Inventor: Herbert Dillard Temple, Archdale, NC (US)

(73) Assignee: Valspar Sourcing, Inc., Minneapolis, MN (US)

(*) Notice: Subject to any disclaimer, the term of this patent is extended or adjusted under 35 U.S.C. 154(b) by 428 days.

(21) Appl. No.: 13/275,789

(22) Filed: Oct. 18, 2011

(65) Prior Publication Data

US 2012/0094129 A1   Apr. 19, 2012

Related U.S. Application Data

(60) Provisional application No. 61/394,232, filed on Oct. 18, 2010.

(51) Int. Cl.
| | |
|---|---|
| *B32B 27/38* | (2006.01) |
| *B32B 9/04* | (2006.01) |
| *B05D 3/02* | (2006.01) |
| *C08F 2/50* | (2006.01) |
| *C08L 83/02* | (2006.01) |
| *C09D 7/00* | (2006.01) |
| *C09D 175/16* | (2006.01) |

(52) U.S. Cl.
CPC .............. *C09D 7/005* (2013.01); *C09D 175/16* (2013.01)
USPC ........... 428/413; 428/447; 427/515; 427/386; 522/46; 524/858

(58) Field of Classification Search
None
See application file for complete search history.

(56) References Cited

U.S. PATENT DOCUMENTS

| | | | |
|---|---|---|---|
| 4,241,141 A | 12/1980 | Dill | |
| 5,271,988 A * | 12/1993 | Ikemoto et al. | 428/195.1 |
| 5,418,304 A | 5/1995 | Mueller et al. | |
| 5,631,042 A | 5/1997 | Becker et al. | |
| 5,750,269 A | 5/1998 | Park | |
| 5,773,091 A | 6/1998 | Perlman et al. | |
| 5,910,369 A | 6/1999 | Macris et al. | |
| 5,910,535 A | 6/1999 | Smith | |
| 5,929,005 A | 7/1999 | Smith | |
| 6,048,471 A | 4/2000 | Henry | |
| 6,221,988 B1 | 4/2001 | Mueller et al. | |
| 6,228,433 B1 * | 5/2001 | Witt | 427/487 |
| 6,312,815 B1 | 11/2001 | Macris et al. | |
| 6,399,670 B1 * | 6/2002 | MacQueen et al. | 522/64 |
| 6,399,689 B1 * | 6/2002 | Scarlette | 524/430 |
| 6,579,353 B1 | 6/2003 | DeLaMater et al. | |
| 6,833,186 B2 * | 12/2004 | Perrine et al. | 428/329 |
| 6,974,605 B2 | 12/2005 | Macris et al. | |
| 7,238,386 B2 * | 7/2007 | Workman et al. | 427/162 |
| 7,247,671 B2 | 7/2007 | Overbeek et al. | |
| 7,282,272 B2 * | 10/2007 | Jones et al. | 428/500 |
| 7,378,460 B2 | 5/2008 | Schmidt et al. | 523/160 |
| 7,470,728 B2 * | 12/2008 | Jia et al. | 523/109 |
| 7,501,472 B2 | 3/2009 | Steidl et al. | |
| 7,794,844 B2 * | 9/2010 | Dean et al. | 428/447 |
| 2003/0003310 A1 | 1/2003 | Macris et al. | |
| 2003/0059555 A1 * | 3/2003 | Fenn et al. | 427/558 |
| 2004/0258933 A1 | 12/2004 | Enniss et al. | |
| 2005/0004300 A1 | 1/2005 | Overbeek et al. | |
| 2005/0272141 A1 | 12/2005 | Crawford | |
| 2006/0194707 A1 | 8/2006 | Lu | |
| 2007/0166642 A1 | 7/2007 | Inoue | |
| 2007/0291586 A1 | 12/2007 | Zwieg | |
| 2008/0318064 A1 * | 12/2008 | Outlaw et al. | 428/446 |
| 2009/0017313 A1 * | 1/2009 | Outlaw et al. | 428/446 |
| 2009/0054570 A1 | 2/2009 | Wu et al. | |
| 2009/0111910 A1 | 4/2009 | Gimvang | |

FOREIGN PATENT DOCUMENTS

| | | | | |
|---|---|---|---|---|
| CA | 2572279 A1 | | 6/2008 | |
| CN | 1566235 | * | 1/2005 | C09D 5/16 |
| CN | 101333347 | * | 4/2010 | C09D 4/00 |

OTHER PUBLICATIONS

MSDS for Bermasilk MK5, 4 pages, 2001.*
Machine-generated English language translation of CN-1566235, 17 pages, translation generated Jun. 2014.*
Machine-generated English language translation of CN-101333347, 14 pages, translation generated Jun. 2014.*
First Office Action from the State Intellectual Property Office of the People's Republic of China (SIPO) dated Nov. 13, 2013 and English translation from counterpart Chinese application No. 201110398921.4, 10 pp.
Examination Report from corresponding Canadian application No. 2,755,151, dated Aug. 22, 2012, 2, pp.
Zielnik, "Rules of the graffitti game", Journal of Architectural Coatings, Mar./Apr. 2007, 7 pages.
Joe Maty, "Taking aim against tagging", Journal of Architectural Coatings, Mar./Apr. 2007, 11 pages.
"Directory of Anit-Graffiti Coatings and Removal Products", Journal of Architectural Coatings, Mar./Apr. 2007, 6 pages.

* cited by examiner

*Primary Examiner* — Robert S Loewe
(74) *Attorney, Agent, or Firm* — Shumaker & Sieffert, P.A.

(57) ABSTRACT

A coating composition including a functionalized resin selected from at least one of polyurethanes, epoxies, polyamides, chlorinated polyolefins, acrylics, polyesters, or mixtures or copolymers thereof, wherein the resins comprises at least one of (meth)acryl or acetoacetyl functionality; a (meth)acryl functional compound; and a functionalized silicone compound.

14 Claims, No Drawings

ANTI-GRAFFITI COATINGS

This application claims the benefit of U.S. Provisional Application No. 61/394,232, filed Oct. 18, 2010, the entire content of which is incorporated herein by reference.

BACKGROUND

The coatings applied to some substrates such as, for example, pre-finished wood flooring, cabinets and furniture, can be permanently stained by the inks and colorants in pens, markers and the like. Once the topcoat is marred by the ink, the ink marks may only be removable by applying a strong solvent, rubbing with an abrasive pad, or complete removal of layers of the coating (or the entire coating) in the marked areas. In many cases, even if the ink is partially removed by rubbing or a solvent, the finish may be permanently damaged, stained or marked as a result of the cleaning process.

SUMMARY

In general, the present disclosure is directed to coating compositions that may be cured to provide a coating with enhanced resistance to the stains and marks caused by the ink and colorants in pens, markers and the like, as well as methods for making the coating compositions and the coatings.

In one embodiment, the present disclosure is directed to a coating composition, including a functionalized resin selected from at least one of polyurethanes, epoxies, polyamides, chlorinated polyolefins, acrylics, polyesters, or mixtures or copolymers thereof, wherein the resins comprises at least one of (meth)acryl or acetoacetyl functionality; a (meth)acryl functional compound; and a functionalized silicone compound.

In another embodiment, the invention is directed to a coating composition, including about 40 wt % to about 60 wt % of a multifunctional (meth)acryl resin selected from urethanes and epoxies; about 10 wt % to about 25 wt % of a multi(meth)acryl functional compound; about 0.1 wt % to about 10 wt % of a photoinitiator; and about 0.1 wt % to about 5 wt % of a (meth)acryl functional silicone compound.

Coatings prepared from the coating compositions described herein are highly mar resistant, as well as resistant to staining from the inks and colorants in pens and markers, particularly "permanent" markers.

The details of one or more embodiments of the invention are set forth in the description below. Other features, objects, and advantages of the invention will be apparent from the description, and from the claims.

DETAILED DESCRIPTION

The present disclosure is directed to a coating composition (e.g. paint) that resists staining by the ink and colorants from pens, markers and the like. The coating composition includes a functionalized resin, an ethylenically unsaturated functional compound and a functionalized silicone compound. Coatings made from the coating composition are preferably curable with ultraviolet ("UV") radiation.

A wide variety of functionalized polymer resins may be used in the coating composition, and suitable polymers include, but are not limited to, polyurethanes, epoxies, polyamides, chlorinated polyolefins, acrylics, oil-modified polymers, polyesters, and mixtures or copolymers thereof. Resins with (meth)acryl and/or acetoacetyl functionality have been found to be particularly useful (wherein "(meth)acryl" refers to an acrylate and methacrylate).

For example, in one embodiment, the functionalized resin is a urethane (meth)acrylate (wherein "(meth)acrylate" refers to an acrylate and a methacrylate). A versatile array of (meth)acrylated urethane oligomers exists to satisfy a broad range of applications, and the properties of these materials may vary depending upon selection of the type of isocyanate and polyol modifier used to form the resin, the reactive functionality and molecular weight. The urethane (meth)acrylate resins used in the coating compositions described in this disclosure may include one or more (meth)acryl functional groups. Preferred urethane (meth)acrylates include, but are not limited to, reactive multifunctional aromatic urethane (meth)acrylates available from Sartomer Corp., Exton, Pa., under trade designations such as CN 970, CN 972, and CN 975, which have varying urethane content and molecular weight. Preferred urethane (meth)acrylates include oligomers such as the hexafunctional aromatic urethane acrylate CN 975 (molecular weight of approx. 800). Other suitable urethane (meth)acrylates include the resins available from Cytec Industries, Woodland Park, N.J., such as EBECRYL 220 (molecular weight approx. 1000), a prepolymer based upon acrylic acid, an aliphatic unsaturated polyester and an aromatic isocyanate, and EBECRYL 8301 (molecular weight approx. 1000), a hexafunctional aliphatic urethane acrylate containing an acrylated polyol diluent.

In another embodiment, the resin is a functionalized epoxy, and (meth)acryl functional epoxy resins are particularly preferred. For example, one suitable functionalized epoxy resin is a difunctional bisphenol A based epoxy acrylate available under the trade designation CN120A80 from Sartomer Corp.

In yet another embodiment, the resin may include acetoacetyl-functionality. In general, any polymerizable hydroxy functional or other active hydrogen containing monomer can be converted to the corresponding acetoacetyl-functional monomer by reaction with diketene or other suitable acetoacetylating agent (see, e.g., Comparison of Methods for the Preparation of Acetoacetylated Coating Resins, Witzeman, J. S.; Dell Nottingham, W.; Del Rector, F. J. Coatings Technology; Vol. 62, 1990, 101 (and references contained therein)). In preferred coating compositions, the acetoacetyl-functional group is incorporated into the polymer via 2-(acetoacetoxy)ethyl methacrylate, t-butyl acetoacetate, diketene, or combinations thereof.

The amount of the functionalized resin in the coating composition is preferably about 20% by weight to about 80% by weight, more preferably about 30% to about 70%, and even more preferably about 40% to about 60%.

In addition to the functionalized resins discussed above, the coating compositions described in this disclosure also include ethylenically unsaturated compounds. Preferably, such compounds are multifunctional (i.e., include two or more ethylenically unsaturated groups). The ethylenically unsaturated compounds may be monomers, oligomers, polymers, or mixtures thereof, and may be used in various combinations to modify the properties of the coating composition, such as, for example, viscosity, cure rate, wetting and adhesion. The ethylenically unsaturated compounds may also provide a crosslinkable diluent function to the coating compositions.

Preferred such ethylenically unsaturated compounds include (meth)acrylate functionality (wherein "(meth)acrylate" refers to an acrylate and a methacrylate), vinyl functionality, vinyl ether functionality, (meth)allyl ether functionality (wherein (meth)allyl ether refers to an allyl ether and a methallyl ether), or mixtures thereof.

The coating compositions of this disclosure can include one or more different ethylenically unsaturated compounds, preferably one or more (meth)acrylate monomers. Preferably, the (meth)acrylate monomers have two or more (meth)acrylate groups (i.e., they are multifunctional). The (meth)acrylate functional groups of the (meth)acrylate monomers are bonded to a core structural group, which may be based on a wide variety of organic structures including tripropylene glycol, isobornyl alcohol, isodecyl alcohol, phenoxyethyl alcohol, trishydroxyethyl isocyanurate, trimethylolpropane ethoxylate, hexanediol, ethoxylated and propoxylated neopentyl glycol, oxyethylated phenol, polyethylene glycol, bisphenol ethoxylate, neopentyl glycol propoxylate, trimethylolpropane, propoxylated glycerol, di-trimethylolpropane, pentaerythritol, tetrahydrofurfuryl alcohol, beta-carboxyethyl alcohol, substituted derivatives of the above, combinations of the above, and the like.

Examples of suitable (meth)acrylate monomers include isobornyl (meth)acrylate, isodecyl (meth)acrylate, phenoxyethyl (meth)acrylate, trimethylolpropane tri(meth)acrylate, trimethylolpropane ethoxylate tri(meth)acrylate, tripropylene glycol di(meth)acrylate, hexanediol di(meth)acrylate, tetrahydrofurfuryl (meth)acrylate, beta-carboxyethyl (meth)acrylate, bisphenol A ethoxylate di(meth)acrylate, ethoxylated and propoxylated neopentyl glycol di(meth)acrylates, di-(trimethyolpropane tetra (meth)acrylate), pentaerythritol tri(meth)acrylate, pentaerythritol tetra(meth)acrylate, or mixtures thereof.

Suitable (meth)acrylate monomers include, but are not limited to, tripropylene glycol diacrylate (TPGDA), available from Sartomer Corp., Exton, Pa. under the trade designation SR 306, 1, 6 hexanediol diacrylate (HDDA) available from Sartomer under the trade designation SR 238, and trimethylolpropane triacrylate (TMPTA), available from Sartomer under the trade designation SR 351.

Another example of a suitable ethylenically unsaturated compound is an allyl ether. Preferably, the allyl ether functional groups of the allyl ether monomers are bonded to a core structural group which is based on a wide variety of polyhydric alcohols. Suitable polyhydric alcohols include neopentyl glycol, trimethylolpropane, ethylene glycol, propylene glycol, butylene glycol, diethylene glycol, trimethylene glycol, triethylene glycol, trimethylolethane, pentaerythritol, glycerol, diglycerol, 1,4-butanediol, 1,6-hexanediol, 1,4-cyclohexanedimethanol, and the like. Various mixtures of such alcohols can be used, if desired.

Examples of suitable allyl ether monomers include hydroxyethyl allyl ether, hydroxypropyl allyl ether, trimethylolpropane monoallyl ether, trimethylolpropane diallyl ether, trimethylolethane monoallyl ether, trimethylolethane diallyl ether, glycerol monoallyl ether, glycerol diallyl ether, pentaerythritol monoallyl ether, pentaerythritol diallyl ether, pentaerythritol triallyl ether, 1,2,6-hexanetriol monoallyl ether, 1,2,6-hexanetriol diallyl ether, and the like. Propoxylated and ethoxylated forms of these compounds are also suitable.

Another example of a suitable ethylenically unsaturated compound is a vinyl ether. Examples of suitable vinyl ether monomers include 4-hydroxybutyl vinyl ether, 1,4-cyclohexanedimethanol monovinyl ether, 1,4-cyclohexanedimethanol divinyl ether, ethylene glycol monovinyl ether, ethylene glycol divinyl ether, diethylene glycol monovinyl ether, diethylene glycol divinyl ether, triethylene glycol divinyl ether, and the like. Propoxylated and ethoxylated forms of these compounds are also suitable.

The amount of the ethylenically unsaturated compounds in the coating composition is preferably about 20% by weight to about 80% by weight, more preferably 30% to 70%, and even more preferably 40% to 60%.

In addition to the functionalized resins and the ethylenically unsaturated compounds described the above, the coating compositions described in this disclosure include a silicone compound to enhance the surface properties of the cured coating made from the composition, particularly mar resistance and ink resistance. Suitable silicone compounds include non-reactive and reactive functionalized silicones. Functionalized silicones are preferred. While not wishing to be bound by any theory, presently available evidence indicates that when the coating compositions are cured, the functionalized silicones become an embedded permanent part of the crosslinked structure of the cured film, which not only enhances crosslink density, but also distributes silicone throughout the film. Since the silicone material is not confined to the surface of the film, the resulting coating resists penetration and permanent staining caused by inks, colorants and the like.

Suitable reactive silicones include, but are not limited to, acrylic functional polyester modified polydimethylsiloxane, polyether modified hydroxyl functional polydimethylsiloxane, epoxy functional siloxane, and amine functional siloxane. Examples include crosslinkable (meth)acryl functional silicone compounds available under the trade designation TEGO RAD from Evonik Industries, Parsippany, N.J., particularly TEGO RAD 2650. Another example is a silicone diacrylate available under the trade designation EBECRYL 350 from Cytec Surface Specialties of Dragenbos, Belgium. Yet another example is a reactive silicone surface additive available under the trade designation BYK from BYK Chemie, Wessel, Germany, particularly acryl-functional silicones such as, for example, BYK 371, a polydimethylsiloxane modified with an acrylfunctional polyester.

The amount of the silicone compound in the coating composition is preferably about 0.1% by weight to about 5% by weight, more preferably about 1% to about 3%, and even more preferably about 1.5% to about 2%.

The coating composition is preferably radiation curable, and may be cured via visible light, electron beam, thermal initiation, or cationic initiation. In a preferred embodiment, the coating compositions are ultraviolet ("UV") radiation-curable, and includes a (meth)acryl functional resin, an ethylenically unsaturated functional compound, a functional silicone compound, and a photoinitiator. Certain embodiments of the present invention include polymers that are curable by UV or visible light. These coating compositions typically include a free-radical initiator, particularly a photoinitiator that induces the curing reaction upon exposure to light. The photoinitiator is preferably present in an amount of at least 0.1 wt %, based on the total weight of the coating composition. The photoinitiator is preferably present in an amount of no greater than 10 wt %, based on the total weight of the coating composition.

Among photoinitiators suitable for use in the present invention with resins having (meth)acrylate or allyl ether functional groups are alpha-cleavage type photoinitiators and hydrogen abstraction-type photoinitiators. The photoinitiator may include other agents such as a coinitiator or photoinitiator synergist that aid the photochemical initiation reaction. Suitable cleavage type photoinitiators include alpha, alpha-diethoxyacetophenone (DEAP), dimethoxyphenylacetophenone (commercially available under the trade designation IRGACURE 651 from Ciba Corp., Ardsley, N.Y.), hydroxy-cyclo-hexylphenylketone (commercially available under the trade designation IRGACURE 184 from Ciba Corp.), 2-hydroxy-2-methyl-1-phenylpropan-1-one (commercially available under the trade designation DAROCUR 1173 from Ciba Corp.), a 25:75 blend of bis-(2,6-dimethoxybenzoyl)-2,4,4- trimethylpentyl phosphine oxide and 2-hydroxy-2-methyl-1-phenylpropan-1-one (commercially available under the trade designation IRGACURE 1700 from Ciba Corp.), a 50:50 blend of 2-hydroxy-2-methyl-1-phenylpropan-1-one and 2,4,6-trimethylbenzoyl-diphenylphosphine oxide (TPO, commercially available under the trade designation DAROCUR 4265 from Ciba Corp.), phosphine oxide, 2,4,6-trimethyl benzoyl (commercially available under the trade name IRGACURE 819 and IRGACURE 819DW from Ciba Corp.), 2,4,6-trimethylbenzoyl-diphenylphosphine oxide (commercially available under the trade designation LUCIRIN from BASF Corp., Mount Olive, N.J.), and a mixture of 70% oligo 2-hydroxy-2-methyl-4-(1-methylvinyl)phenylpropan-1-one and 30% 2-hydroxy-2-methyl-1-phenylpropan-1-one) (commercially available under the trade designation KIP 100 from Sartomer, Exton, Pa.), and aromatic ketones such as the compounds available under the trade designation TINOCURE from Ciba Corp. Suitable hydrogen abstraction-type photoinitiators include benzophenone, substituted benzophenones (such as that commercially available under the trade designation ESCACURE TZT from Fratelli-Lamberti), and other diaryl ketones such as xanthones, thioxanthones, Michler's ketone, benzyl, quinones, and substituted derivatives of all of the above. Preferred photoinitiators include DAROCUR 1173, KIP 100, benzophenone, IRGACURE 184 and TINOCURE.

Other mixtures of photoinitiators may also be used in the coating compositions. Camphorquinone is one example of a suitable photoinitiator for curing a coating composition with visible light.

The coating compositions described in this disclosure can also include a coinitiator or photoinitiator synergist. The coinitiators can be tertiary aliphatic amines (such as methyl diethanol amine and triethanol amine), aromatic amines (such as amylparadimethylaminobenzoate, 2-n-butoxyethyl-4-(dimethylamino) benzoate, 2-(dimethylamino)ethylbenzoate, ethyl-4-(dimethylamino)benzoate, and 2-ethylhexyl-4-(dimethylamino)benzoate, (meth)acrylated amines (such as those commercially available under the trade designations EBECRYL 7100 and UVECRYL P104 and P115, all from UCB RadCure Specialties, Smyrna, Ga.), and amino-functional acrylate or methacrylate resin or oligomer blends (such as those commercially available under the trade designations EBECRYL 3600 or EBECRYL 3703, both from UCB RadCure Specialties). Combinations of the above categories of compounds may also be used.

Preferred photoinitiators include benzophenone, 4-methylbenzophenone, benzoyl benzoate, phenylacetophenones, 2,2-dimethoxy-2-phenylacetophenone, alpha,alpha-diethoxyacetophenone, hydroxycyclo-hexylphenylketone, 2-hydroxy-2-methyl-1-phenylpropan-1-one, bis-(2,6-dimethoxybenzoyl)-2,4,4-trimethylpentyl phosphine oxide, 2-hydroxy-2-methyl-1-phenylpropan-1-one, 2-hydroxy-2-methyl-1-phenylpropan-1-one, 2,4,6-trimethylbenzoyl-diphenylphosphine oxide, and combinations thereof.

Coating compositions having resins with vinyl ether functional groups can be cured by UV or visible light using cationic-generating photoinitiators. Examples of suitable cationic-generating photoinitiators include super acid-generating photoinitiators, such as triarylsulfonium salts. One useful triarylsulfonium salt is triphenyl sulfonium hexafluorophosphate.

The amount of hydrogen abstraction-type photoinitiator in such a composition is preferably at least 0.1 wt %, more preferably at least 0.2 wt %, and even more preferably at least 0.4 wt-%, based upon the total weight of the composition. The amount of hydrogen abstraction-type photoinitiator in such a composition is preferably no more than 4 wt %, more preferably no more than 3 wt %, and even more preferably no more than 2 wt %, based upon the total weight of the composition.

Coating compositions having resins with vinyl ether functional groups can be cured by UV or visible light using cationic-generating photoinitiators. Examples of suitable cationic-generating photoinitiators include super acid-generating photoinitiators, such as triarylsulfonium salts. One useful triarylsulfonium salt is triphenyl sulfonium hexafluorophosphate.

Many coating compositions that may be cured by UV or visible light may also be cured with an electron beam. Techniques and devices for curing a coating composition using an electron beam are known in the art. These techniques do not require a photoinitiator for electron beam cure of the coating.

Coating compositions that include compounds with (meth)acryl and/or allyl functional groups may also be thermally cured using a suitable initiator. The thermal initiator typically facilitates the curing process by a free radical mechanism and typically includes a peroxide or azo compound. Peroxide compounds suitable for use as initiators in the coating compositions of the present invention include t-butyl perbenzoate, t-amyl perbenzoate, cumene hydroperoxide, t-amyl peroctoate, methyl ethyl ketone peroxide, benzoyl peroxide, cyclohexanone peroxide, 2,4-pentanedione peroxide, di-t-butyl peroxide, t-butyl hydroperoxide, and di-(2-ethylhexyl)-peroxydicarbonate. Suitable azo compounds which may be employed as an initiator in the present compositions include 2,2-azo bis-(2,4-dimethylpentane-nitrile), 2,2-azo bis-(2-methylbutanenitrile), and 2,2-azo bis-(2-methylpropanenitrile).

Certain coating compositions of the present invention may also include one or more of a group of ingredients that can be generally referred to as performance enhancing additives. Typical performance enhancing additives that may be employed include surface active agents, pigments, colorants, dyes, surfactants, thickeners, heat stabilizers, leveling agents, anti-cratering agents, curing indicators, plasticizers, fillers, sedimentation inhibitors, ultraviolet-light absorbers, optical brighteners, and the like to modify properties.

Coating compositions may include a surface-active agent that modifies the interaction of the curable coating composition with the substrate, in particular, the agent can modify the ability of the composition to wet a substrate. Surface active agents may have other properties as well. For example, surface active agents may also include leveling, defoaming, or flow agents, and the like. The surface active agent affects qualities of the curable coating composition including, for example, how the coating composition is handled, how it spreads across the surface of the substrate, and how it bonds to the substrate. If it is used, the surface active agent is preferably present in an amount of no greater than 5 wt %, based on the total weight of the coating composition.

Surface active agents have also been found to assist incorporation as well as assist coating formulation. Surface active agents suitable for use in coating compositions are known to those of skill in the art or can be determined using standard methods. Exemplary surface active agents include polydimethylsiloxane surface active agents (such as those commercially available under the trade designations SILWET L-760 and SILWET L-7622 from OSI Specialties, South Charleston, W. Va., or BYK 306, BYK 333, BYK 411 and BYK 346 from Byk-Chemie, Wallingford, Conn.) and fluorinated surface active agents (such as that commercially available as FLUORAD FC-430 from 3M Co., St. Paul, Minn.). The surface active agents may include a defoamer. Suitable defoamers include polysiloxane defoamers (such as a methylalkylpolysiloxane like that commercially available under the trade designation BYK 077 or BYK 500 from Byk-Chemie) or polymeric defoamers (such as that commercially available under the trade designation BYK 051 from Byk-Chemie).

The invention may also include other ingredients that modify properties of the curable coating composition as it is stored, handled, or applied, and at other or subsequent stages. Waxes, flatting agents, mar and abrasion additives, and other similar performance enhancing additives may be employed as required in amounts effective to upgrade the performance of the cured coating and the coating composition, as long as the mar and ink resistance of the coating is not substantially compromised. Desirable performance characteristics of the coating include chemical resistance, abrasion resistance, hardness, gloss, reflectivity, appearance, or combinations of these characteristics, and other similar characteristics.

For example, if a flatting agent or a mar/abrasion additive is used, it is preferably a compound that does not absorb, or contribute to the absorption of, inks that are commonly used in pens or markers. Suitable examples include, but are not limited to, wax-treated silicas and non-silica organic flatting agents. A suitable non-silica organic flatting agent is a polymeric urea available under the trade designation BERMASILK from Albemarle Corp., Baton Rouge, La., and BERMASILK MK has been found to be particularly useful.

As another example, to provide enhanced abrasion and mar resistance to the cured coating, the coating composition may optionally include up to about 20 wt % metal particles. Suitable metal particles include, but are not limited to, aluminum particles such as those available under the trade designation ALUMAX R-1000 from Alumax Aluminum Corp. of Pittsburgh, Pa. For example, metal particles with a particle size of about 800 to about 1000 grit are useful for flooring coatings.

Other components of the coating compositions of the present invention include those typically used in paint formulations, such as thickeners, biocides, mildewcides, surfactants, dispersants, defoamers, and the like. Suitable additives for use in coating compositions of the present invention are described in Koleske et al., Paint and Coatings Industry, April, 2003, pages 12-86.

In some embodiments, the coating composition may include at least 40 wt % water, based on the total weight of the composition. Coating compositions of the present invention preferably include no more than 90 wt % water, and more preferably no more than 70 wt % water, based on the total weight of the composition.

Such waterborne coating compositions have a relatively low volatile organic content without sacrificing the balance of properties desired for an applied (i.e., dry) coating, such as a paint. Preferably, the coating compositions have a relatively low volatile organic content (VOC). Preferably, the coating compositions include no more than 10 wt % volatile organic compounds, based on the total weight of the composition. More preferably, the coating compositions of the present invention include no more than 7 wt % volatile organic compounds. Volatile organic compounds are defined in U.S. Pat. No. 6,048,471 (Henry) and in the U.S. Federal Register: Jun. 16, 1995, volume 60, number 111.

In the waterborne coating compositions the polymers are preferably either water-dispersible or latex polymers. A "water-dispersible" polymer means the polymer is itself capable of being dispersed into water (i.e., without requiring the use of a separate surfactant), or water can be added to the polymer to form a stable aqueous dispersion (i.e., the dispersion should have at least one month shelf stability at normal storage temperatures). Such water-dispersible polymers can include nonionic or anionic functionality on the polymer, which assist in rendering them water-dispersible. For such polymers, external acids or bases are typically required for anionic stabilization. As used in this application, a "latex" polymer means a dispersion of polymer particles in water. A latex polymer typically requires a secondary dispersing agent (e.g., a surfactant) for creating a dispersion or emulsion of polymer particles in water. Suitable water dispersible and latex polymers include, for example, alkyds, polyesters, and polyurethanes. Such polymers may be prepared by any method known in the art.

The latex polymers are typically stabilized by one or more nonionic or anionic emulsifiers (i.e., surfactants), used either alone or together. Examples of suitable nonionic emulsifiers include tert-octylphenoxyethylpoly(39)-ethoxyethanol, dodecyloxypoly(10)ethoxyethanol, nonylphenoxyethyl-poly (40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl)phenoxypoly(20)ethoxyethanol, hydroxyethylcellulosepolybutyl acrylate graft copolymer, dimethyl silicone polyalkylene oxide graft copolymer, poly (ethylene oxide)poly(butyl acrylate) block copolymer, block copolymers of propylene oxide and ethylene oxide, 2,4,7,9-tetramethyl-5-decyne-4,7-diol ethoxylated with 30 moles of ethylene oxide, N-polyoxyethylene(20)lauramide, N-lauryl-N-polyoxyethylene(3)amine, and poly(10)ethylene glycol dodecyl thioether. Examples of suitable anionic emulsifiers include sodium lauryl sulfate, sodium dodecylbenzenesulfonate, potassium stearate, sodium dioctyl sulfosuccinate, sodium dodecyldiphenyloxide disulfonate, nonylphenoxyethylpoly(1)ethoxyethyl sulfate ammonium salt, sodium styrene sulfonate, sodium dodecyl allyl sulfosuccinate, linseed oil fatty acid, sodium or ammonium salts of phosphate esters of ethoxylated nonylphenol, sodium octoxynol-3-sulfonate, sodium cocoyl sarcocinate, sodium 1-alkoxy-2-hydroxypropyl sulfonate, sodium alpha-olefin ($C_{14}$-$C_{16}$) sulfonate, sulfates of hydroxyalkanols, tetrasodium N-(1,2-dicarboxy ethyl)-N-octadecylsulfosuccinamate, disodium N-octadecylsulfosuccinamate, disodium alkylamido polyethoxy sulfosuccinate, disodium ethoxylated nonylphenol half ester of sulfosuccinic acid and the sodium salt of tert-octylphenoxyethoxypoly(39)ethoxyethyl sulfate. Various combinations of emulsifiers can be used, if desired.

Latex polymers, particularly ones having some acidic functionality, are sometimes further stabilized by neutralization using ammonia or an amine. To reduce luminescence in a clear coating, the latex polymers may also be stabilized by a nitrogen-free base (e.g., an inorganic metal base such as KOH, $Ca(OH)_2$, NaOH, LiOH, etc.).

An example of a method of preparing a water-dispersible polyester includes reacting one or more polybasic acids with one or more polyols to give a polymer with excess hydroxyl functionality. The resulting polyester could be further reacted with either t-butyl acetoacetate, or diketene to incorporate acetoacetyl-functionality onto the polymer, and with a suitable anhydride such as trimellitic anhydride to render the polyester acid functional. The resulting acid functionality may then be neutralized with a neutralizing base to render the polyester water dispersible. For coatings containing acetoacetyl-functional polymers (particularly clear coatings, more particularly those that are substantially non-luminescing), the use of a nitrogen-free base (e.g., KOH, $Ca(OH)_2$, NaOH, LiOH, etc.) is preferred.

An example of a method of preparing a water-dispersible alkyd includes reacting one or more of the alcoholysis product of an oil and polyol, fatty acids, monoglycerides or diglycerides and one or more polybasic acids with one or more polyols to give a polymer with excess hydroxyl functionality.

The resulting alkyd could be further reacted with either t-butyl acetoacetate, or diketene to incorporate acetoacetyl-functionality onto the polymer, and with a suitable anhydride such as trimellitic anhydride to render the alkyd acid functional. The resulting acid functionality may then be neutralized with a neutralizing base to render the alkyd water dispersible. For coatings containing acetoacetyl-functional polymers (particularly clear coatings, more particularly those that are substantially non-luminescing), the use of a nitrogen-free base (e.g., KOH, Ca(OH)$_2$, NaOH, LiOH, etc.) is preferred.

For coating compositions having a mixture of (meth)acryl, allyl ether, and vinyl ether functional groups, a combination of curing procedures may be used. For example, a coating composition having both (meth)acryl and vinyl ether functional groups typically includes an alpha-cleavage type and/or hydrogen abstraction type photoinitiator for the (meth)acryl functional groups and a cationic-generating photoinitiator for the vinyl ether groups.

Other methods for curing the coating compositions of the invention can be used alone or in combination with methods described hereinabove. Supplemental curing methods include heat cure, chemical cure, anaerobic cure, moisture cure, oxidative cure, and the like. Each method of cure requires a corresponding curing initiator or curing agent, which is included in the composition. For example, thermal cure can be induced by peroxides, metal drier packages can induce an oxidative cure, and multifunctional amines (for example isophorone diamine) can effect a chemical crosslinking cure through Michael addition of amine groups onto acrylate reactive unsaturated groups. If these additional initiators are present in the coating composition they are preferably present in an amount of at least 0.1 wt %, based on the weight of the coating composition. Preferably, they are present in an amount of no greater than 12 wt %, based on the weight of the coating composition.

The coating compositions described herein may be applied to a variety of substrates including wood, cement, cement fiber board, wood-plastic composites, tile, metal, plastic, glass, optical fibers, and fiberglass. The coating compositions described herein can be used as a seal coating directly on the surface of the substrate, as a topcoat applied over a stained substrate surface, or overlying another seal coat or topcoat.

The coating compositions can be applied to a substrate by a variety of methods including, for example, spraying, painting, rollcoating, brushing, fan coating, curtain coating, spreading, air knife coating, die-coating, vacuum coating, spin coating, electrodeposition, and dipping.

The thickness of the coatings will vary with the application. Typically, the coatings will have a thickness of 0.1 mil to 20 mils (0.00025 cm to 0.0508 cm), however, thicker or thinner coatings are also contemplated depending on, for example, the desired coating properties.

The present invention also provides methods for coating that involve applying a coating composition to a substrate and allowing the coating composition to harden (e.g., by exposing the coating composition to radiation such as ultraviolet or visible light). The present invention also provides coatings prepared or preparable from the coating compositions described herein. For example, a coating of the present invention is preparable by a method that involves applying a coating composition to a substrate and allowing the coating composition to harden (e.g., by exposing the coating composition to radiation such as ultraviolet or visible light).

Preferred coatings are cured by exposing the coating to radiation having a wavelength in the range of $10^{-3}$ nm to 800 nm. More preferably, coating compositions of the present invention are exposed to ultraviolet or visible light in the range of 200 nm to 800 nm. Coating compositions of this invention may also be cured by thermal means or other forms of radiation such as, for example, electron beam.

Preferred coatings, which are designed to be cured by ultraviolet or visible light, are preferably exposed to 100 Mjoules/cm$^2$ to 5000 Mjoules/cm$^2$, more preferably exposed to 300 Mjoules/cm$^2$ to 2000 Mjoules/cm$^2$, and even more preferably exposed to 500 Mjoules/cm$^2$ to 1750 Mjoules/cm$^2$.

As used in this application, the term "anti-graffiti" or "mar resistant" refers to coatings that, when hardened, are not permanently damaged by the solvent-borne inks and dyes in permanent markers such as those available from Sanford LP, Oak Brook, Ill., under the trade designation Sharpie. Typical permanent markers include dyes suspended in a solvent such as, for example, propanol, butanol, acetone or diacetone alcohol, and mixtures thereof.

If the coatings in this disclosure are marked by ink from a permanent marker, the ink is removable from the coating by rubbing with a dry cloth, or rubbing with the cloth in combination with application of a mild alcohol-based solvent like rubbing alcohol or nail polish remover. Following the ink removal process, the coating is substantially shadow free, preferably completely shadow-free, and its gloss level remains substantially unaffected, preferably completely unaffected.

EXAMPLES

The following examples are offered to aid in understanding of embodiments of the presently described coating compositions, and are not to be construed as limiting the scope of this disclosure. Unless otherwise indicated, all parts and percentages are by weight.

Reagents:
ALUMAX R-1000—Al particles (Alumax Aluminum Corp., Pittsburgh, Pa.)
ACRYSOL RM-2020NPR—urethane rheology modifier (Dow, Midland, Mich.)
BENZOPHENONE—photoinitiator
BERMASILK MK—polymeric urea flatting agent (Albemarle Corp., Baton Rouge, La.)
BYK 346—silicone surfactant (Byk-Chemie, Wallingford, Conn.)
BYK 411—modified urea anti-settling agent (Byk-Chemie, Wallingford, Conn.)
CN 975—hexafunctional urethane acrylate (Sartomer, Exton, Pa.)
CN 971 A80—urethane acrylate blended with tripropylene glycol diacrylate (TPGDA, SR306) (Sartomer)
CN 120 A80—epoxy diacrylate blended with tripropylene glycol diacrylate (TPGDA, SR306) (Sartomer)
DISPERBYK—dispersing aid (Byk-Chemie, Wallingford, Conn.)
DOWANOL DPM—glycol ether solvent (Dow, Midland, Mich.)
EBECRYL P104—acrylated amine photoactivator from Cytec Surface Specialties, Dragenbos, Belgium
IRGACURE 500—1-hydroxy-cyclohexyl-phenyl-ketone and benzophenone-photoinitiator
LITHENE PL—polybutadiene resin leveling, slip agent (Synthomer, Ltd. Harlow, UK)
POLYPHASE AF1—fungicide (Troy Corp., Florham Park, N.J.)
SANDUVOR—light stabilizer, prevents photochemical degradation (Clariant International, Ltd., Muttenz, CZ)

SILSURF Di-1010 octamethylcyclotetrasiloxane defoamer (Siltech Corp., Toronto, Calif.)
SR 238—1,6 hexanediol diacrylate (HDDA) (Sartomer)
SR 306—tripropylene glycol diacrylate (TPGDA) (Sartomer)
TEGO AIREX 904W—defoamer (Evonik Industries, Parsippany, N.J.)
TEGO RAD 2650—crosslinkable silicone acrylate (Evonik Industries, Parsippany, N.J.)
TINOCURE—aromatic ketone photoinitiator (Ciba Corp., Ardsley, N.Y.)
TMPTA—trimethylolpropane triacrylate
RICON 130—maleinized polybutadiene (Sartomer)
UCECOAT 7655—waterborne acrylated polyurethane dispersion from Cytec Surface Specialties, Dragenbos, Belgium
ZONYL FSP—anionic phosphate fluorosurfactant (DuPont, Wilmington, Del.)

Example 1

Preparation of Urethane Coating Composition

The metal particles and flatting agents listed in Table 1 below were dispersed in a mixer/disperser such as those available from Morehouse Cowles, Chino, Calif., or Hockmeyer Equipment Corp., Elizabeth City, N.C. Then, the remainder of the ingredients were added and dispersed in the mixer to create a coating composition.

TABLE 1

| Description | Lbs | Gallons |
|---|---|---|
| CN975 | 204.146 (21.2 wt %) | 20.415 |
| CN971A80 | 281.916 (29.2 wt %) | 30.878 |
| TPGDA | 77.770 (8.1 wt %) | 9.054 |
| HDDA | 116.6547 (12.1 wt %) | 13.5803 |
| SANDUVOR VSU | 1.4896 (0.15 wt %) | 0.1862 |
| TINOCURE 1173 | 29.1637 (3.0 wt %) | 3.2418 |
| GENOCURE MBF | 19.4425 (2.0 wt %) | 2.0127 |
| POLYPHASE AF-1 | 0.4913 (0.05 wt %) | 0.0504 |
| DISPERBYK-163 | 9.7212 (1.0 wt %) | 1.1783 |
| LITHENE PL | 0.9721 (0.1 wt %) | 0.1312 |
| BERMASILK MK | 68.0486 (7.0 wt %) | 5.8361 |
| ALUMAX R-1000 | 46.6619 (4.8 wt %) | 1.4004 |
| TEGO RAD 2650 | 18.4703 (1.91 wt %) | 2.2525 |
| BYK-411 | 1.9442 (0.20 wt %) | 0.2222 |
| | 964.38 | 100.00 |

The coating composition was roll coated on a sample of wood flooring, and then cured using UV light to form a coating.

After curing was complete, the coating was marked with a permanent marker available from Sanford LP, Oak Brook, Ill., under the trade designation Sharpie. After the ink from the marker was dry, the mark was wiped with a white cotton rag. Soft wipes were used initially, then more aggressive wipes, to evaluate whether the ink could be completely removed without affecting coating gloss or removing the coating. If a shadow or stain remained after wiping with the cotton cloth, rubbing alcohol and/or nail polish remover were used to remove any remaining marks.

The ink marks were all completely removable, and the coatings remained undamaged.

Example 2

Preparation of Epoxy Coating Composition

Using the procedure set forth in Example 1 above, an epoxy coating composition was prepared with the ingredients in Table 2 below.

After curing was complete, the coating was marked with a permanent marker available from Sanford LP, Oak Brook, Ill., under the trade designation Sharpie. After the ink from the marker was dry, the mark was wiped with a white cotton rag. Soft wipes were used initially, then more aggressive wipes, to evaluate whether the ink could be completely removed without affecting coating gloss or removing the coating. If a shadow or stain remained after wiping with the cotton cloth, rubbing alcohol and/or nail polish remover were used to remove any remaining marks.

The ink marks were all completely removable, and the coatings remained undamaged.

TABLE 2

| Description | Lbs | Gallons |
|---|---|---|
| TPDGA (SR 306) | 100.00 | 11.641 |
| CN120A80 | 250.00 | 26.757 |
| TMPTA | 143.50 | 15.683 |
| TINOCURE 1173 | 30.00 | 3.3348 |
| RICON 130 | 1.00 | 0.135 |
| BENZOPHENONE | 20.00 | 2.1867 |
| DISPERBYK-163 | 5.00 | 0.6061 |
| BERMASILK MK | 70.00 | 6.0034 |
| CN120A80 | 260.00 | 27.8373 |
| EBECRYL P104 | 30.00 | 3.2751 |
| TEGO RAD 2650 | 19.00 | 2.3199 |
| BYK-411 | 2.00 | 0.2286 |
| | 930.50 | 100.02 |

Example 3

Preparation of Aqueous UV-Curable Coating Composition

Using the procedure set forth in Example 1 above, an aqueous, UV curable coating composition was prepared with the ingredients in Table 3 below.

TABLE 3

| Description | Pounds | Gallons |
|---|---|---|
| UCECOAT 7655 | 740.262 | 84.602 |
| IRGACURE 500 | 22.432 | 2.407 |
| DOWANOL DPM | 17.543 | 2.215 |
| BYK-346 | 2.243 | 0.269 |
| TEGO AIREX 904 W | 0.561 | 0.065 |
| SILTECH DL 1010 | 8.636 | 1.016 |
| ZONYL FSP | 0.561 | 0.058 |
| DI WATER | 67.297 | 8.079 |

Various embodiments of the invention have been described. These and other embodiments are within the scope of the following claims.

The invention claimed is:

1. A coating composition, comprising:
   a functionalized epoxy resin wherein the epoxy resin comprises at least one of (meth)acryl or acetoacetyl functionality;
   a (meth)acryl functional compound;
   a silicone compound with (meth)acryl functionality;
   a non-silica organic flatting agent; and
   metal particles.

2. The coating composition of claim 1, wherein the (meth) acrylate is multifunctional.

3. The coating composition of claim 1, wherein the (meth) acryl functional compound is a multifunctional monomer selected from the group consisting of isobornyl (meth)acrylate, isodecyl (meth)acrylate, phenoxyethyl (meth)acrylate, trimethylolpropane tri(meth)acrylate, trimethylolpropane ethoxylate tri(meth)acrylate, tripropylene glycol di(meth) acrylate, hexanediol di(meth)acrylate, tetrahydrofurfuryl (meth)acrylate, beta-carboxyethyl (meth)acrylate, bisphenol A ethoxylate di(meth)acrylate, ethoxylated neopentyl glycol di(meth)acrylate, propoxylated neopentyl glycol di(meth) acrylate, di-(trimethyolpropane tetra (meth)acrylate), pentaerythritol tri(meth)acrylate, pentaerythritol tetra(meth) acrylate, and mixtures thereof.

4. The coating composition of claim 1, wherein the silicone compound is multifunctional.

5. The coating composition of claim 1, further comprising a photoinitiator.

6. The coating composition of claim 5, wherein the photoinitiator comprises benzophenone, 4-methylbenzophenone, benzoyl benzoate, phenylacetophenones, 2,2-dimethoxy-2-phenylacetophenone, alpha,alpha-diethoxyacetophenone, hydroxycyclo-hexylphenylketone, 2-hydroxy-2-methyl-1-phenylpropan-1-one, bis-(2,6-dimethoxybenzoyl)-2,4,4-trimethylpentyl phosphine oxide, 2-hydroxy-2-methyl- 1-phenylpropan- 1-one, 2-hydroxy-2-methyl-1-phenylpropan-1-one, 2,4,6-trimethylbenzoyl-diphenylphosphine oxide, or combinations thereof.

7. The coating composition of claim 5, wherein the composition is at least partially curable by ultraviolet or visible light.

8. The coating composition of claim 1, wherein the flatting agent comprises a polymeric urea.

9. A method of coating a substrate, the method comprising applying the coating composition of claim 1 to a substrate and allowing the coating composition to harden.

10. A coating on a substrate preparable by the method of claim 9.

11. A coating composition, comprising:
    about 40 wt % to about 60 wt % of a multifunctional (meth)acryl epoxy resin;
    about 10 wt % to about 25 wt % of a multi(meth)acryl functional compound;
    about 0.1 wt % to about 10 wt % of a photoinitiator;
    about 0.1 wt % to about 5 wt % of a (meth)acryl functional silicone compound;
    a non-silica organic flatting agent; and
    metal particles.

12. The coating composition of claim 11, wherein the (meth)acrylate-functional compound is selected from the group consisting of trimethylolpropane tri(meth)acrylate, tripropylene glycol di(meth)acrylate, hexanediol di(meth) acrylate, and mixtures thereof.

13. A method of coating a substrate, the method comprising applying the coating composition of claim 11 to a substrate and exposing the coating composition to ultraviolet or visible light.

14. A method of coating a substrate surface, the method comprising:
    applying to a substrate surface a coating composition comprising:
    a multi(meth)acryl functional epoxy resin;
    a multi(meth)acryl functional compound;
    a photoinitiator;
    a crosslinkable (meth)acryl functional silicone compound; and
    a non-silica organic flatting agent; and
    metal particles; and
    applying ultraviolet or visible light to the coating composition to at least partially cure the coating composition.

* * * * *